United States Patent
Vaezi Joze (10) Patent No.: US 11,354,934 B2
(45) Date of Patent: Jun. 7, 2022

(54) LOCATION MATCHED SMALL SEGMENT FINGERPRINT READER

(71) Applicant: Microsoft Technology Licensing, LLC, Redmond, WA (US)

(72) Inventor: Hamidreza Vaezi Joze, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 454 days.

(21) Appl. No.: 15/970,411

(22) Filed: May 3, 2018

(65) Prior Publication Data

US 2019/0340414 A1 Nov. 7, 2019

(51) Int. Cl.
*G06V 40/12* (2022.01)
*G06F 3/041* (2006.01)
(Continued)

(52) U.S. Cl.
CPC ........ *G06V 40/1388* (2022.01); *G06F 3/0416* (2013.01); *G06F 3/0488* (2013.01); *G06V 40/1312* (2022.01); *G06V 40/1365* (2022.01)

(58) Field of Classification Search
CPC .......... G06K 9/00114; G06K 9/00033; G06K 9/00087; G06K 9/00006; G06F 3/0416; G06F 3/0488
See application file for complete search history.

(56) References Cited

U.S. PATENT DOCUMENTS

| 6,766,040 B1 * | 7/2004 | Catalano | G06V 40/1365 |
| | | | 382/209 |
| 7,412,083 B2 | 8/2008 | Takahashi | |

(Continued)

FOREIGN PATENT DOCUMENTS

| EP | 3312752 A1 * | 4/2018 | ............. G06F 21/32 |
| EP | 3312752 A1 | 4/2018 | |
| WO | 2005043451 A2 | 5/2005 | |

OTHER PUBLICATIONS

"International Search Report and Written Opinion Issued in PCT Application No. PCT/US2019/028597", dated Aug. 13, 2019, 10 Pages.

(Continued)

*Primary Examiner* — John W Lee
(74) *Attorney, Agent, or Firm* — Holzer Patel Drennan (57) ABSTRACT

Electronic fingerprint readers are often used for security such as log-in authentication for the identification of a user for selective access to a computing system. As computing devices shrink in overall size and with downward pressure on device pricing, smaller and less expensive fingerprint readers are increasingly desired. While whole fingerprint readers have the greatest accuracy in user identification, the whole fingerprint is often not required for user identification. Often, only a portion of the user's fingerprint is required to adequately identify the user and thus a small segment fingerprint reader may be sufficient for user authentication. However, the smaller the sensing area of the small-segment fingerprint reader, the more likely that the fingerprint reader misidentifies the user or fails to collect sufficient information to identify the user. Systems and methods for improving identification accuracy of small-segment fingerprint readers are disclosed in detail herein.

22 Claims, 5 Drawing Sheets

(51) Int. Cl.
*G06F 3/0488* (2022.01)
*G06V 40/13* (2022.01)

(56) References Cited

U.S. PATENT DOCUMENTS

| | | | |
|---|---|---|---|
| 9,715,616 B2 | 7/2017 | Han et al. | |
| 2007/0248249 A1* | 10/2007 | Stoianov | G06V 40/1365 |
| | | | 382/124 |
| 2016/0307023 A1* | 10/2016 | Kim | G06F 21/32 |
| 2017/0147865 A1 | 5/2017 | Jensen et al. | |
| 2018/0285622 A1* | 10/2018 | Alsaadi | G06V 40/1353 |

OTHER PUBLICATIONS

Galton, Francis, "Fingerprint Directories", In Publication of Macmillan and Company, May 1895, 146 Pages.

H. Faulds, "On the skin-furrows of the hand," Nature, vol. 22, No. 574, p. 605, 1880.

Lee, et al., "Advances in Fingerprint Technology", In Publication of CRC Press Boca Raton London, Jun. 15, 2001, 577 Pages.

Ross, et al., "Estimating Fingerprint Deformation", In Proceedings of First International Conference in Biometric Authentication, Jul. 15, 2004, 7 Pages.

Wang, et al., "Fit-sphere Unwrapping and Performance Analysis of 3D Fingerprints", In Journal of Applied Optics, vol. 49, Issue 4, Feb. 1, 2010, pp. 592-600.

* cited by examiner

LOCATION MATCHED SMALL SEGMENT FINGERPRINT READER

BACKGROUND

A fingerprint (or finger impression) is an impression left by the friction ridges of a human finger. Fingerprints are detailed, nearly unique, difficult to alter, and durable over the life of an individual, making them suitable as long-term markers of human identity.

A fingerprint reader is an electronic device used to capture a digital image (or live scan) of a user's fingerprint. The live scan is digitally processed to create a biometric template (a collection of extracted features, such as measured physical differences between ridges and valleys of the user's fingerprint), which is stored and later used for matching (referred to herein as "enrollment"). Capturing a fingerprint using a fingerprint reader typically includes touching a sensing area with the user's finger. The sensing area captures differences between the valleys and ridges of the user's fingerprint. In other implementations, non-contact or touchless 3D fingerprint scanners capture the user's fingerprint without contact with the sensing area.

Electronic fingerprint readers are often used for security such as log-in authentication for the identification of a user for selective access to a computing system. Matching algorithms are used to compare previously stored templates of the user's fingerprint against candidate fingerprints for potential matching. As computing devices shrink in overall size and with downward pressure on device pricing, smaller and less expensive fingerprint readers are increasingly desired.

SUMMARY

Implementations described and claimed herein provide a computing device comprising a touch sensor defining a user interface area of the computing device, the touch sensor to detect an area and location of a user's finger impression on the touch sensor; a fingerprint sensor defining an reader area and location within and smaller than the user interface area and also smaller than an expected area of the user's finger impression; and a matching module to compare the detected area and location of the user's finger impression on the touch sensor with the reader area and location of the fingerprint sensor within the touch sensor.

Implementations described and claimed herein further provide a method of using a small-segment fingerprint reader within a computing device. The method comprises detecting an area and location of a user's finger impression on a touch sensor, sensing a fingerprint pattern of the user's finger impression at a fingerprint sensor occupying a reader area within and smaller than the touch sensor, comparing the detected area and location of the user's finger impression on the touch sensor with an area and location of the fingerprint sensor within the touch sensor, selecting one or more stored template finger impression segments based on one or more corresponding closest matches in the comparing operation, and applying the selected finger impression segments to the sensed finger impression to identify the user.

Implementations described and claimed herein still further provide a computing device comprising a matching data store to store a plurality of template segments of a user's finger impression, each template segment corresponding to a subdivision area of the user's finger impression. The computing device further comprises a touchscreen defining a user interface area of the computing device, the touchscreen to detect an area and location of the user's finger impression on the touchscreen. The computing device still further comprises a fingerprint sensor defining a reader area and location within and smaller than the user interface area and also smaller than an expected area of the user's finger impression. The computing device further still comprises a matching module to compare a detected area and location of the user's finger impression on the touch sensor with the reader area and location of the fingerprint sensor within the touch sensor, select one or more closest matching template finger impression segments, and apply the selected template finger impression segments to a sensed candidate finger impression to identify the user.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTIONS

While whole fingerprint readers have the greatest accuracy in user identification, the whole fingerprint is often not required for user identification and cost and space constraints for a whole fingerprint reader on a computing device may be prohibitive. Small segment fingerprint readers are fingerprint readers substantially smaller than an average user's fingerprint and only intended to capture a portion of the user's fingerprint for each scan. Often, only a portion of the user's fingerprint is required to adequately identify the user and thus a small segment fingerprint reader may be sufficient for user authentication. However, the smaller the sensing area of the small-segment fingerprint reader, the more likely that the fingerprint reader misidentifies the user or fails to collect sufficient information to identify the user. Systems and methods for improving identification accuracy of small-segment fingerprint readers are disclosed in detail herein.

Figure 1:
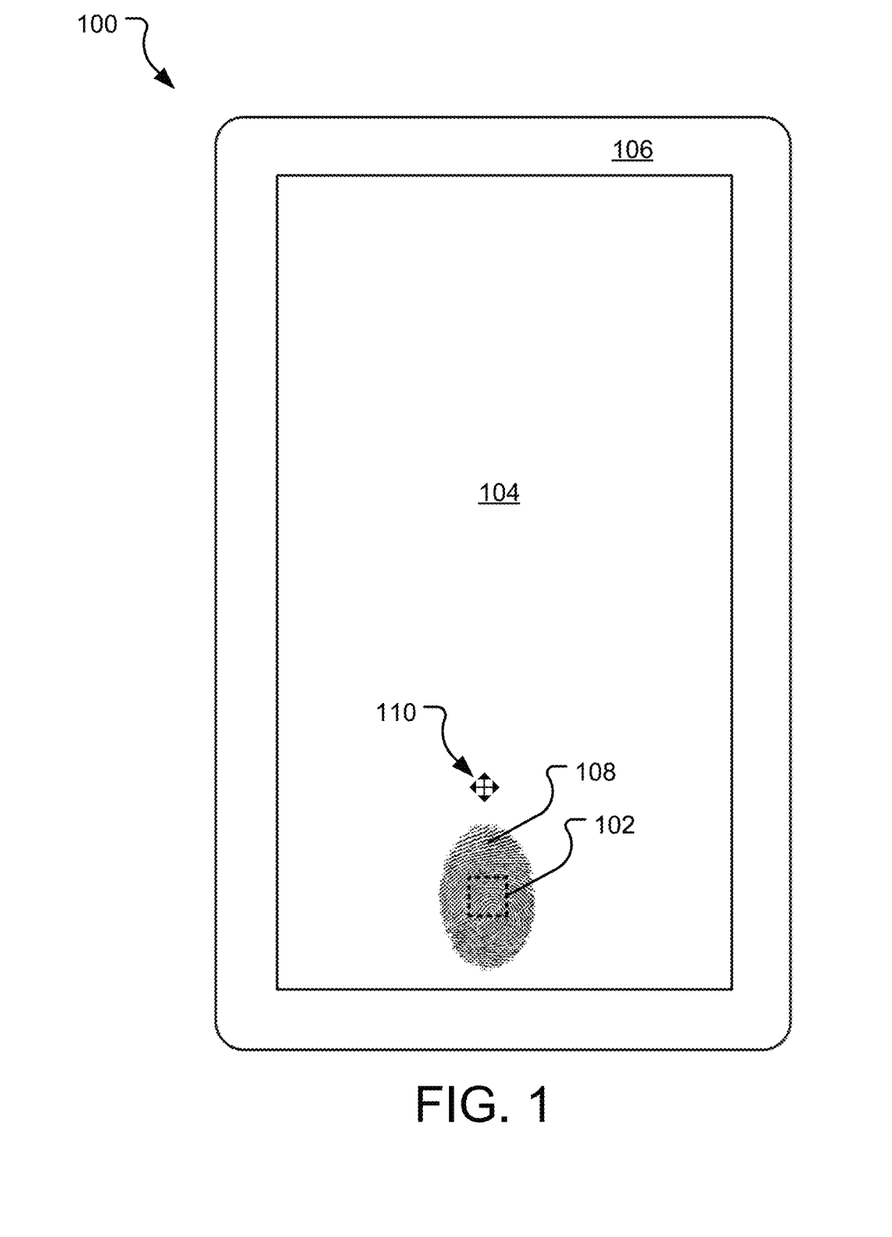
FIG. 1 illustrates an example touchscreen computing device with a location-matched small-segment fingerprint sensor.

FIG. 1 illustrates an example computing device 100 with a location-matched small-segment fingerprint sensor 102. The computing device 100 includes a touchscreen 104 that spans a front-facing surface and a chassis 106 that spans a border around the touchscreen 104 and a rear-facing surface of the computing device 100. In various implementations, the touchscreen 104 may be referred to as a touch sensor and the area the touchscreen 104 occupies or defines on the computing device 100 may be referred to as a user interface area. The chassis 106 and the touchscreen 104 in combination serve as protective covers and mounting structures for internal electronic components (e.g., structural framework, printed circuit boards, microprocessors, integrated circuits, electronic storage devices, cooling components, cameras, antennae, speakers, microphones, batteries, touch sensors, fingerprint sensors, a matching module, a matching data store, and so on) of the computing device 100. The chassis 106 and/or the touchscreen 104 may also occupy side-facing surfaces of the computing device 100, and in combination encompass the internal electronic components of the computing device 100.

The fingerprint sensor 102 is incorporated within the touchscreen 104 and may be hidden from view (as illustrated by dotted lines). In various implementations, a top glass of the touchscreen 104 is used as a transparent layer for the fingerprint sensor 102. The fingerprint sensor 102 occupies or defines a reader area and location within the touchscreen 104 smaller than an expected area of a user's finger impression 108. In other implementations, the touchscreen 104 incorporates multiple fingerprint sensors, a combination of which occupies an area within the touchscreen 104 smaller than the expected area of the user's finger impression 108. Multiple fingerprint sensors may increase the accuracy of an associated fingerprint reader. The user's finger impression 108 may be of any of the user's 10 fingers (including the user's 2 thumbs). In various implementations, the fingerprint sensor 102 may distinguish between impressions of one or more of the user's 10 fingers.

In various implementations, the area of the fingerprint sensor 102 is approximately one eighth of the expected area of the user's finger impression 108 or approximately 15 mm$^2$. In other implementations, the area of the fingerprint sensor 102 ranges from 10% to 90% of the expected area of the user's finger impression 108.

The fingerprint sensor 102 may utilize a variety of technologies for capturing fingerprints, including but not limited to optical, capacitive, RF, thermal, piezo-resistive, ultrasonic, piezoelectric, and microelectromechanical technologies. In some implementations, the fingerprint sensor 102 is non-contact or touchless (i.e., it does not require contact with the touchscreen 104 to detect the user's finger impression 108). The fingerprint sensor 102 is combined with additional components of the computing device 100 (e.g., a matching module, not shown) to form a small-segment fingerprint reader, as shown and described in further detail below with respect to fingerprint reader 444 of FIG. 4.

The touchscreen 104 is able to detect the user's finger impression 108 specific placement on the touchscreen 104 relative to the fingerprint sensor 102. In some implementations, the touchscreen 104 is also able to detect the user's finger impression 108 rotation relative to the fingerprint sensor 102. This placement and/or rotation information allows the fingerprint reader to more accurately identify the user by making the fingerprint reader aware of what portion of the user's finger impression 108 is exposed to the fingerprint sensor 102, and perhaps the orientation of the user's finger impression 108 with reference to the fingerprint sensor 102.

In some implementations, the touchscreen 104 selectively displays an image similar to that of the user's finger impression 108 on a desired location within the touchscreen 104 that instructs the user to place the finger impression 108 on a specific location of the touchscreen 104 relative to the fingerprint sensor 102. Offering the user a visual instruction on finger impression 108 placement gives the small-segment fingerprint reader the greatest chance of successfully reading and identifying the user's finger impression 108. In various implementations, the touchscreen 104 may offer visual instructions or feedback indicating whether the user has properly placed his/her finger on the touchscreen 104 (e.g., the finger impression image changes color when the user's finger is properly placed and/or the touchscreen 104 displays one or more of a series of up, down, left, and right arrows 110 to instruct the user in what direction to move his/her finger impression 108). The computing device 100 may also or instead provide other instructions or feedback indicating whether the user has properly placed his/her finger on the touchscreen 104 (e.g., haptic and/or audio feedback indicating that the user has properly placed his/her finger on the touchscreen 104).

In various implementations, the computing device 100 is a tablet computer, laptop computer, personal computer, gaming device, smart phone, or any other discrete device that carries out one or more specific sets of arithmetic and/or logical operations. In other implementations for a different computing device, the touchscreen 104 may be supplemented or replaced with another type of sensor (e.g., a thermal sensor, a camera, a contact sensor, laser detector, etc.) to detect the user's finger impression 108 specific placement on the touchscreen 104 relative to the fingerprint sensor 102. In some instances, the computing device 100 is hingedly attached to and/or removable from a keyboard portion (not shown, see e.g., keyboard 212 of FIG. 2). The computing device 100 may also be sealed within a fabric covering (not shown) that serves to protect the internal electronic components from contaminates and hide seams between the various components of the computing device 100 (e.g., seams between the chassis 106 and the touchscreen 104).

Figure 2:
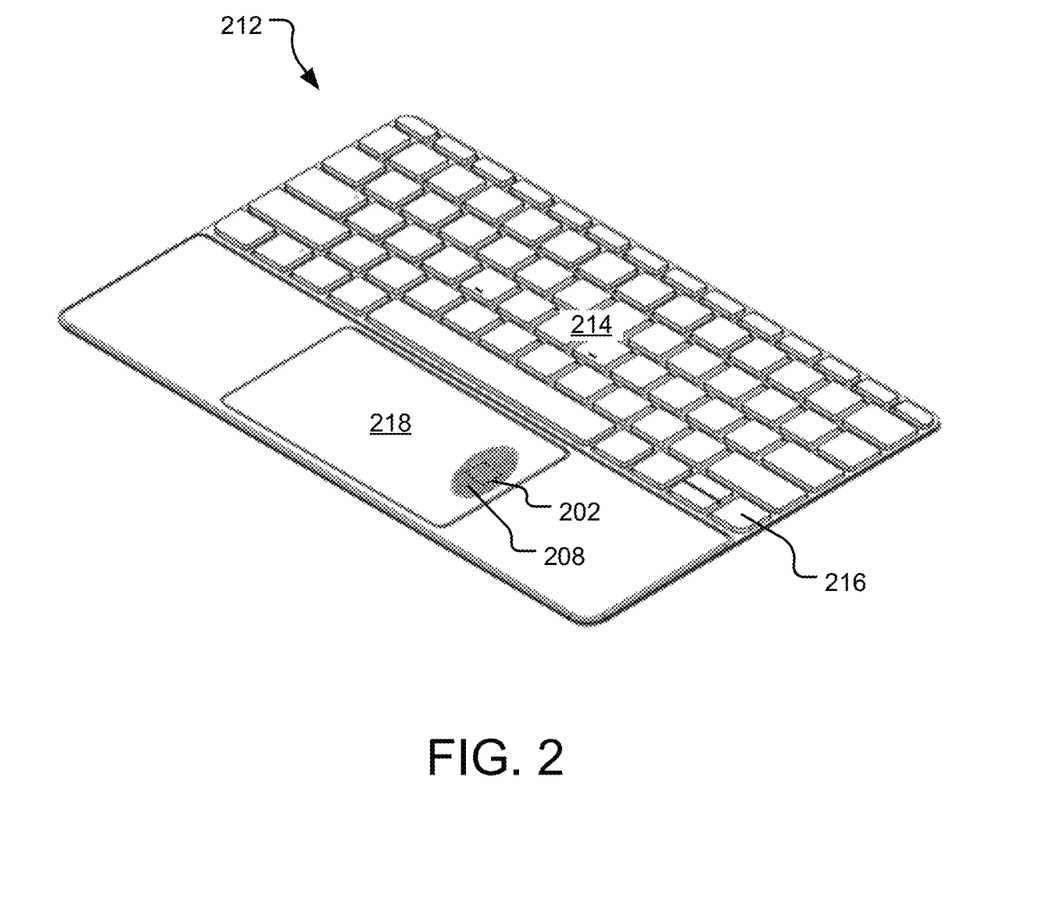
FIG. 2 illustrates an example keyboard with a location-matched small-segment fingerprint sensor.

FIG. 2 illustrates an example keyboard 212 with a location-matched small-segment fingerprint sensor 202. The keyboard 212 may enclose a variety of internal electronic components (e.g., fingerprint sensors, a matching module, a matching data store, and so on). The keyboard 212 includes a keypad 214, which contains an array of keys (e.g., key 216) arranged in a predetermined pattern (e.g., QWERTY). Each key within the keypad 214 may be communicatively connected to a flexible flat cable (not shown) that provides connectivity to the keyboard 212 and ultimately an associated computing device (not shown, see e.g., computing device 100 of FIG. 1).

The keyboard 212 also includes a user-depressible touchpad 218 (alternatively a trackpad or a mousepad) that converts physical user inputs into corresponding electrical signals that may be interpreted by the computing device. In various implementations, the touchpad 218 may be referred to as a touch sensor and the area the touchpad 218 occupies on the keyboard 212 may be referred to as a user interface area. The fingerprint sensor 202 is incorporated within the touchpad 218 and may be hidden from view (as illustrated by dotted lines). In various implementations, a top glass of the touchpad 218 is used as a transparent layer for the fingerprint sensor 202. The fingerprint sensor 202 occupies or defines a reader area and location within the touchscreen 204 smaller than an expected area of a user's finger impression 208. In other implementations, the touchpad 218 incorporates multiple fingerprint sensors, a combination of which occupies an area within the touchpad 218 smaller than the expected area of the user's finger impression 208. Multiple fingerprint sensors may increase the accuracy of an associated fingerprint reader. The user's finger impression 108 may be of any of the user's 10 fingers and the fingerprint sensor 202 may distinguish between impressions of one or more of the user's 10 fingers.

In various implementations, the area of the fingerprint sensor 202 is approximately one eighth of the expected area of the user's finger impression 208 or approximately 15 mm². In other implementations, the area of the fingerprint sensor 202 ranges from 10% to 90% of the expected area of the user's finger impression 208. The fingerprint sensor 202 may utilize a variety of technologies for capturing fingerprints and in some implementations, the fingerprint sensor 202 is non-contact or touchless. The fingerprint sensor 202 is combined with additional components of the keyboard 212 (e.g., a matching module and a matching data store, not shown) to form a small-segment fingerprint reader, as shown and described in further detail below with respect to fingerprint reader 444 of FIG. 4.

The touchpad 218 is able to detect the user's finger impression 208 specific placement on the touchpad 218 relative to the fingerprint sensor 202. In some implementations, the touchpad 218 is also able to detect the user's finger impression 208 rotation relative to the fingerprint sensor 202. This placement and/or rotation information allows the fingerprint reader to more accurately identify the user by making the fingerprint reader aware of what portion of the user's finger impression 208 is exposed to the fingerprint sensor 202, and perhaps the orientation of the user's finger impression 208 with reference to the fingerprint sensor 202.

In some implementations, the touchpad 218 permanently or selectively displays an image similar to that of the user's finger impression 208 on a desired location within the touchpad 218 that instructs the user to place the finger impression 208 on a specific location of the touchpad 218 relative to the fingerprint sensor 202. Offering the user a visual instruction on finger impression 208 placement gives the small-segment fingerprint reader the greatest chance of successfully reading and identifying the user's finger impression 208. In various implementations, the touchpad 218 may offer instructions or feedback indicating whether the user has properly placed his/her finger on the touchscreen 104.

In various implementations, the keyboard 212 may be physically and/or communicatively coupled to a tablet computer, a laptop computer, a personal computer, a gaming device, a smart phone, or any other discrete device that carries out one or more specific sets of arithmetic and/or logical operations. In other implementations, the touchpad 218 may be supplemented or replaced with another sensor to detect the user's finger impression 208 specific placement on the touchscreen 104 relative to the fingerprint sensor 202. In some instances, the keyboard 212 is hingedly attached to and/or removable from a tablet computer or other display (not shown, see e.g., computing device 100 of FIG. 1). The keyboard 212 may also be sealed within a fabric covering (not shown) that serves to protect the internal electronic components from contaminates and hide seams between the various components of the keyboard 212.

Figure 3:
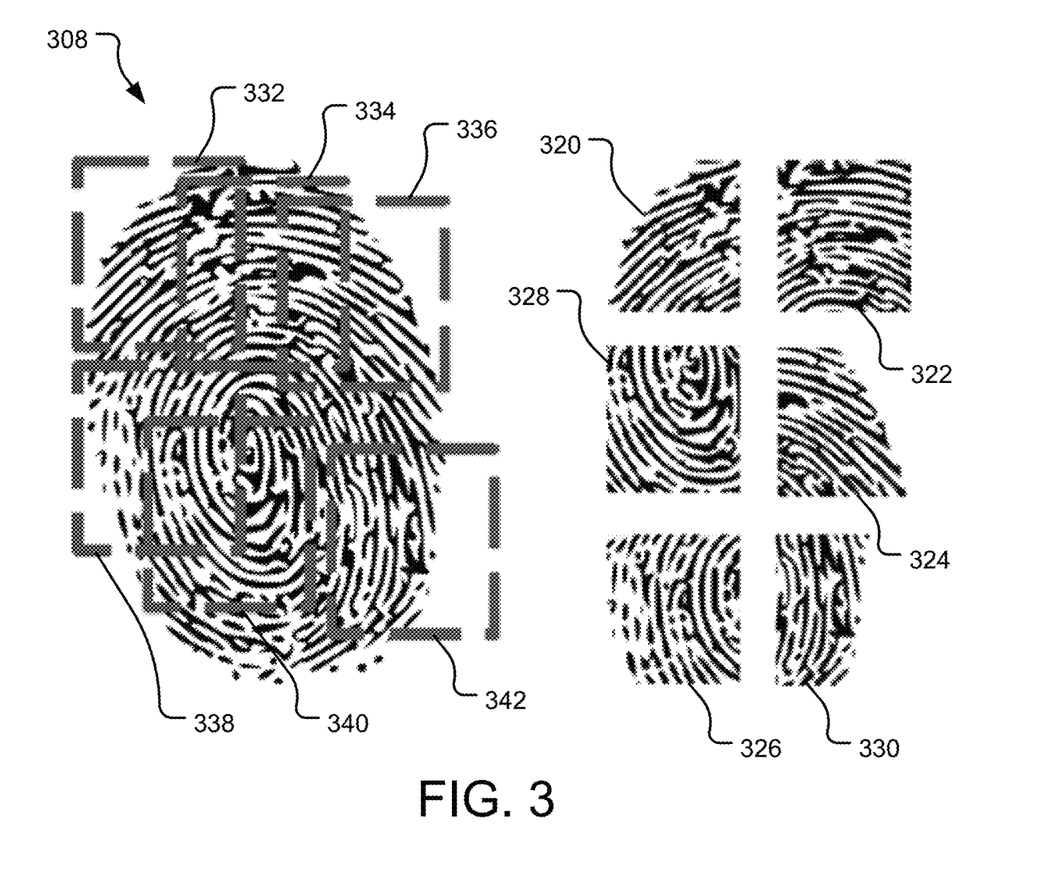
FIG. 3 illustrates an example finger impression sectioned into six small segments for location-matched small-segment fingerprint reading.

FIG. 3 illustrates an example finger impression 308 sectioned into six small segments (or patches) 320, 322, 324, 326, 328, 330 for location-matched small-segment fingerprint reading. Each of the segments 320, 322, 324, 326, 328, 330 correspond to a specific region of the finger impression 308. More specifically, segment 320 corresponds to an upper-left region 332, segment 322 corresponds to an upper-center region 334, segment 324 corresponds to an upper-right region 336, segment 326 corresponds to a lower-left region 338, segment 328 corresponds to a lower-center region 340, and segment 330 corresponds to a lower-right region 342.

Sectioning the finger impression 308 by region allows a small-segment fingerprint reader (not shown, see e.g., fingerprint reader 444 of FIG. 4) to both store detected finger impression templates by region and detect candidate finger impressions by region. Identification of the user based on a singular candidate finger impression section without additional information may result in a low likelihood of successful matching with stored finger impression templates. The likelihood of successful matching may be improved greatly if the user's candidate finger impression section is accompanied with information regarding what region of the user's finger was scanned, as well as if the user's finger was rotated when scanned. A touch sensor (not shown, see e.g., touchscreen 104 and touchpad 218 of FIGS. 1 and 2, respectively) may provide the user's finger location and rotation information to the fingerprint reader for improving the likelihood of successful matching.

The user's finger impression 308 may be of any of the user's 10 fingers (including the user's 2 thumbs). In various implementations, the area of each of the small segments 320, 322, 324, 326, 328, 330 is approximately one sixth of the expected area of a user's finger impression 308 or approximately 15 mm². In other implementations, the area of the small segments 320, 322, 324, 326, 328, 330 ranges from 10% to 90% of the expected area of a user's finger impression 308 and may be approximately equal to an area of an associated fingerprint sensor. In other implementations, the finger impression 308 may be sectioned into greater or fewer individual segments, and/or located in different regions of the finger impression 308 than that depicted in FIG. 3.

Figure 4:
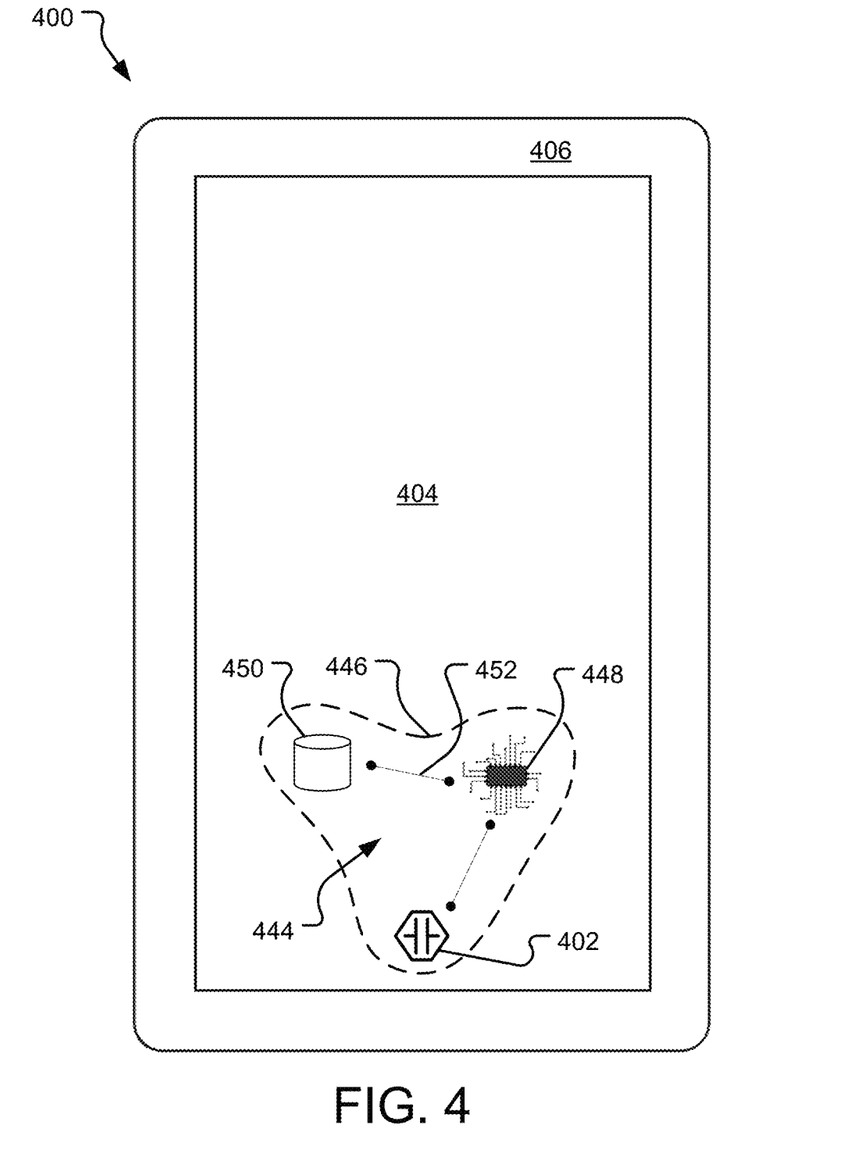
FIG. 4 illustrates interior components of an example computing device with a location-matched small-segment fingerprint reader.

FIG. 4 illustrates interior components of an example computing device 400 with a location-matched small-segment fingerprint reader 444. The computing device 400 includes a touchscreen 404 that spans a front-facing surface and a chassis 406 that spans a border around the touchscreen 404 and a rear-facing surface of the computing device 400. In various implementations, the touchscreen 404 may be referred to as a touch sensor and the area the touchscreen 404 occupies on the computing device 400 may be referred to as a user interface area.

The chassis 406 and the touchscreen 404 in combination serve as protective covers and mounting structures for internal electronic components (e.g., the fingerprint reader 444) of the computing device 400. The chassis 406 and/or the touchscreen 404 may also occupy side-facing surfaces of the computing device 400, and in combination encompass the internal electronic components of the computing device 400. While the fingerprint reader 444 is hidden from view within the computing device 400, window 446 (shown in dashed lines for illustrative purposes) is provided into the computing device 400 to illustrate various components of the fingerprint reader 444.

The fingerprint reader 444 includes a fingerprint sensor 402 incorporated within the touchscreen 404. The fingerprint sensor 402 occupies or defines a reader area and location within the touchscreen 404 smaller than an expected area of a user's finger impression (not shown). In other implementations, the touchscreen 404 incorporates multiple fingerprint sensors, a combination of which occupies an area within the touchscreen 404 smaller than the expected area of the user's finger impression. Multiple fingerprint sensors may increase the accuracy of the fingerprint reader 444. The fingerprint sensor 402 may utilize a variety of technologies for capturing fingerprints, and in some implementations, the fingerprint sensor 402 is non-contact or touchless.

The fingerprint reader 444 further includes a matching data store 450, which serves to store one or more previously scanned finger impressions (referred to herein as template finger impressions) for later use in matching with one or more candidate finger impressions in an effort to identify a user. A matching module 448 is connected to both the matching data store 450 and the fingerprint sensor 402 via wires and/or traces (e.g., wire 452). The matching module 448 functions to compare a detected area and location of the user's finger impression on the touchscreen 404 with an area and location of the fingerprint sensor 402 within the touch sensor (referred to herein as "candidate data"). The matching module 448 further functions by comparing the candidate data to the template finger impressions stored within the matching data store 450 to determine if a match is present. In various implementations, the matching module 448 may be dedicated for the fingerprint reader 444 or shared by performing other functionalities of the computing device 400 as well. Similarly, the matching data store 450 may be dedicated for the fingerprint reader 444 or shared by storing other data for the computing device 400 as well.

The touchscreen 404 is able to detect the user's finger impression specific placement on the touchscreen 404 relative to the fingerprint sensor 402. In some implementations, the touchscreen 404 is also able to detect the user's finger impression rotation relative to the fingerprint sensor 402. This placement and/or rotation information allows the fingerprint reader 444 to more accurately identify the user by making the fingerprint reader 444 aware of what portion of the user's finger impression is exposed to the fingerprint sensor 402, and perhaps the orientation of the user's finger impression with reference to the fingerprint sensor 402.

In some implementations, the fingerprint reader 444 directs the touchscreen 404 to selectively display an image similar to that of the user's finger impression on a desired location within the touchscreen 404. This instructs the user to place the finger impression on a specific location of the touchscreen 404 relative to the fingerprint sensor 402. Offering the user a visual instruction on finger impression placement gives the small-segment fingerprint reader 444 the greatest chance of successfully reading and identifying the user's finger impression. In various implementations, the fingerprint reader 444 may also direct the touchscreen 404 to offer visual instructions or feedback indicating whether the user has properly placed his/her finger on the touchscreen 404). The fingerprint reader 444 may also direct the computing device 400 to also or instead provide other instructions or feedback indicating whether the user has properly placed his/her finger on the touchscreen 404.

In various implementations, the computing device 400 is a tablet computer, laptop computer, personal computer, gaming device, smart phone, or any other discrete device that carries out one or more specific sets of arithmetic and/or logical operations. In other implementations for a different computing device, the touchscreen 404 may be supplemented or replaced with another sensor to detect the user's finger impression specific placement on the touchscreen 404 relative to the fingerprint sensor 402. In some instances, the computing device 400 is hingedly attached to and/or removable from a keyboard portion (not shown, see e.g., keyboard 212 of FIG. 2). The computing device 400 may also be sealed within a fabric covering (not shown) that serves to protect the internal electronic components from contaminates and hide seams between the various components of the computing device 400 (e.g., seams between the chassis 406 and the touchscreen 404).

Figure 5:
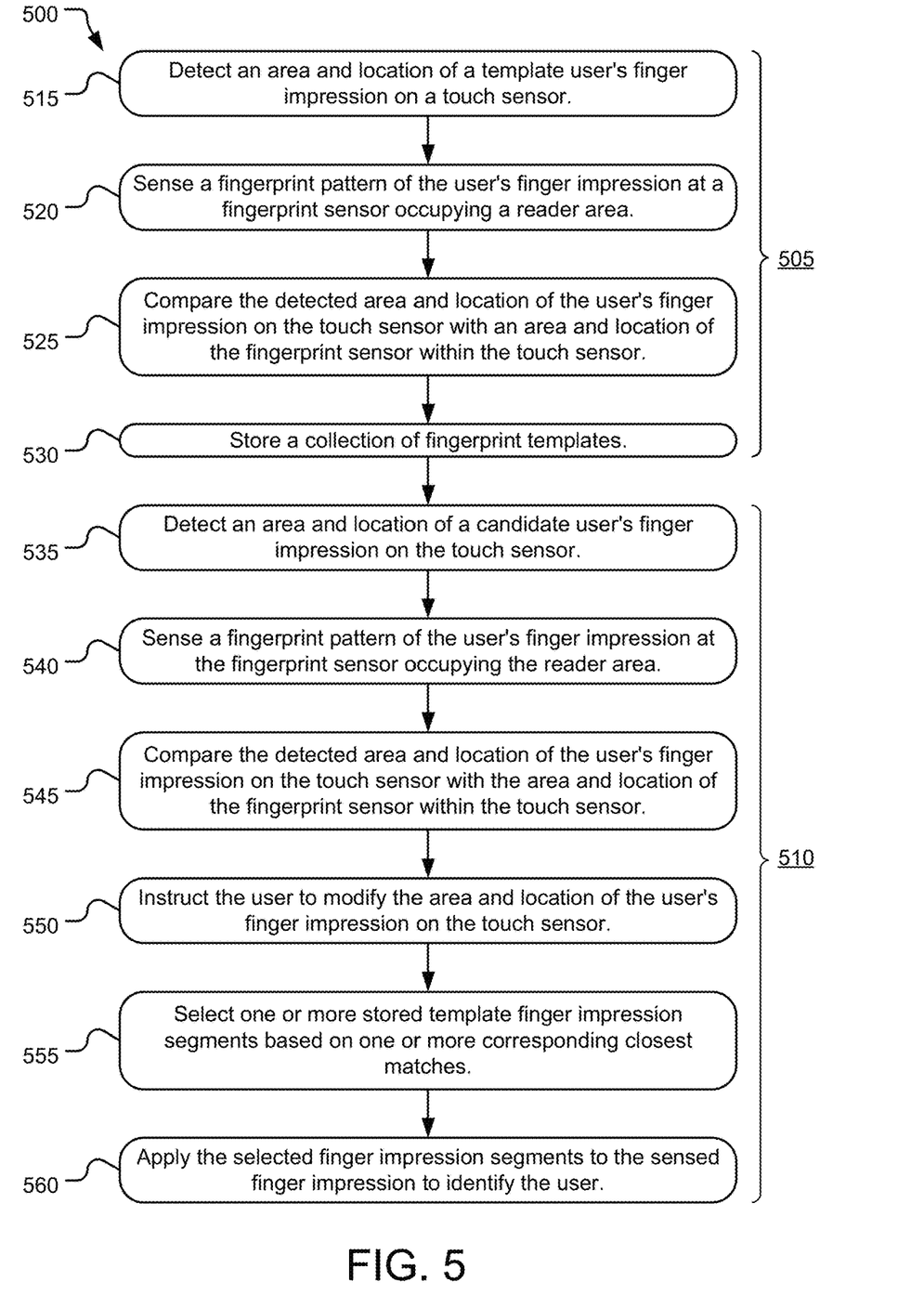
FIG. 5 illustrates example operations for using a location-matched small-segment fingerprint reader.

FIG. 5 illustrates example operations 500 for using a location-matched small-segment fingerprint reader. The operations 500 may be divided into an enrollment process 505 and an identification process 510. The enrollment process 505 begins with a detecting operation 515 that detects an area and location of a template user's finger impression on a touch sensor. A sensing operation 520 senses a fingerprint pattern of the user's finger impression at a fingerprint sensor occupying a reader area within and smaller than the touch sensor.

A comparing operation 525 compares the detected area and location of the user's finger impression on the touch sensor with an area and location of the fingerprint sensor within the touch sensor. A storing operation 530 stores a collection of fingerprint templates, each with the sensed fingerprint pattern and the detected area and location of the user's finger impression on the touch sensor. In some implementations, the storing operation 530 identifies each sensed fingerprint pattern as corresponding to a specific region of the user's finger impression. The enrollment operations 505 may repeat to store numerous template finger impressions corresponding to one or more of a user's fingers, and in some implementations one or more fingers of multiple users.

The identification process 510 begins with a detecting operation 535 that detects an area and location of a candidate user's finger impression on a touch sensor. A sensing operation 540 senses a fingerprint pattern of the user's finger impression at the fingerprint sensor occupying the reader area within and smaller than the touch sensor. A comparing operation 545 compares the detected area and location of the user's finger impression on the touch sensor with the area and location of the fingerprint sensor within the touch sensor.

An instructing operation 550 instructs the user to modify the area and location of the user's finger impression on the touch sensor in response to detecting the area and location of the user's finger impression on the touch sensor. The instructing operation 550 allows the fingerprint reader to fine tune the user's finger impression on the touch sensor so that the fingerprint sensor captures a desired region of the user's finger impression. In various implementations, a selection of operations 535, 540, 545, 550 are repeated iteratively until the detected area and location of the user's finger impression on the touch sensor falls within a predetermined range.

A selecting operation 555 selects one or more stored template finger impression segments based on one or more corresponding closest matches in the comparing operation 545. An applying operation 560 applies the selected finger impression segments to the sensed finger impression to identify the user. In various implementations, a successful applying operation 560 permits the user access to an associated computing device. An unsuccessful applying operation 560 denies the user access to the computing device and may instruct the user to attempt the identification process 510 again. If the identification process 510 is performed unsuccessfully multiple times, the user may be prohibited from performing the identification process 510 again.

The operations making up the embodiments of the invention described herein may be referred to variously as operations, steps, objects, or modules. Furthermore, the operations may be performed in any order, adding or omitting operations as desired, unless explicitly claimed otherwise or a specific order is inherently necessitated by the claim language.

An example computing device according to the presently disclosed technology comprises a touch sensor defining a user interface area of the computing device, the touch sensor to detect an area and location of a user's finger impression on the touch sensor; a fingerprint sensor defining an reader area and location within and smaller than the user interface area and also smaller than an expected area of the user's finger impression; and a matching module to compare the detected area and location of the user's finger impression on the touch sensor with the reader area and location of the fingerprint sensor within the touch sensor.

In another example computing according to the presently disclosed technology, the touch sensor is a touchscreen. The touchscreen presents an image of a desired location of the user's finger impression to the user.

In another example computing according to the presently disclosed technology, the touch sensor is a touchpad. The computing device further comprises a display to present instructions for moving the user's finger impression to a desired location of the user's finger impression.

Another example computing device according to the presently disclosed technology further comprises a matching data store to store a plurality of template segments of the user's finger impression. Each segment corresponds to a subdivision area of the user's finger impression.

In another example computing according to the presently disclosed technology, the matching module further to select one or more matching template finger impression segments and apply the selected template finger impression segments to a candidate finger impression to identify the user.

In another example computing according to the presently disclosed technology, the fingerprint sensor defines an area substantially equal to at least one of the subdivision areas of the user's finger impression segments.

In another example computing according to the presently disclosed technology, the matching data store is to store a plurality of template finger impression segments corresponding to each of a plurality of template finger impressions.

In another example computing according to the presently disclosed technology, the plurality of template finger impressions each correspond to one of a single user and different users.

In another example computing according to the presently disclosed technology, the fingerprint sensor is one of a capacitive fingerprint sensor and an optical fingerprint sensor.

Another example computing device according to the presently disclosed technology further comprises another fingerprint sensor defining a different area and location within and smaller than the user interface area and also smaller than the expected area of the user's finger impression. The matching module is further to compare the detected area and location of the user's finger impression on the touch sensor with a reader area and location of the another fingerprint sensor within the touch sensor.

An example method of using a small-segment fingerprint reader within a computing device according to the presently disclosed technology comprises detecting an area and location of a user's finger impression on a touch sensor, sensing a fingerprint pattern of the user's finger impression at a fingerprint sensor occupying a reader area within and smaller than the touch sensor, comparing the detected area and location of the user's finger impression on the touch sensor with an area and location of the fingerprint sensor within the touch sensor, selecting one or more stored template finger impression segments based on one or more corresponding matches in the comparing operation, and applying the selected finger impression segments to the sensed finger impression to identify the user.

Another example method of using a small-segment fingerprint reader within a computing device according to the presently disclosed technology further comprises collecting the stored template finger impression segments corresponding to subdivision areas of the user's finger impression.

In another example method of using a small-segment fingerprint reader within a computing device according to the presently disclosed technology, the stored template finger impression segments each correspond to one of a single user and different users.

Another example method of using a small-segment fingerprint reader within a computing device according to the presently disclosed technology further comprises instructing the user to modify the area and location of the user's finger impression on the touch sensor in response to detecting the area and location of the user's finger impression on the touch sensor.

In another example method of using a small-segment fingerprint reader within a computing device according to the presently disclosed technology, the detecting and instructing operations are repeated iteratively until the detected area and location of the user's finger impression on the touch sensor falls within a predetermined range.

In another example method of using a small-segment fingerprint reader within a computing device according to the presently disclosed technology, the touch sensor is a touchscreen and the instructing operation is performed by displaying the instructions on the touchscreen.

In another example method of using a small-segment fingerprint reader within a computing device according to the presently disclosed technology, the instructing operation is performed by displaying the instructions on a display of the computing device.

An example computing device according to the presently disclosed technology comprises a matching data store to store a plurality of template segments of a user's finger impression, each template segment corresponding to a subdivision area of the user's finger impression. The example computing device further comprises a touchscreen defining a user interface area of the computing device, the touchscreen to detect an area and location of the user's finger impression on the touchscreen. The example computing device still further comprises a fingerprint sensor defining a reader area and location within and smaller than the user interface area and also smaller than an expected area of the user's finger impression. The example computing device further still comprises a matching module to compare a detected area and location of the user's finger impression on the touchscreen with the reader area and location of the fingerprint sensor within the touch sensor, select one or more matching template finger impression segments, and apply the selected template finger impression segments to a sensed candidate finger impression to identify the user.

In another example computing device according to the presently disclosed technology, the touchscreen to present an image of a desired location of the user's finger impression to the user.

In another example computing device according to the presently disclosed technology, a plurality of template finger impressions each correspond to one of a single user and different users.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A computing device for enrolling fingerprint templates corresponding to partial fingerprints comprising:
   a touch sensor defining a user interface area of the computing device, the touch sensor to detect an area and location of a user's finger impression on the touch sensor;
   a display to present instructions to the user to modify the area and location of the user's finger impression on the touch sensor, wherein the instructions are repeated iteratively until the detected area and location of the user's finger impression on the touch sensor falls within a predetermined range;
   a fingerprint sensor defining a reader area and location within the user interface area, the reader area being smaller than the user interface area;
   a matching feature within electronic storage and executed using a microprocessor, the matching feature to:
      compare the detected area and location of the user's finger impression on the touch sensor with the reader area and location of the fingerprint sensor within the touch sensor,
      identify one of multiple regions of the user's finger impression oriented over the fingerprint sensor based on the comparing operation, and
      read a sensed fingerprint pattern from the user's finger impression using the fingerprint sensor; and
   a matching data store to:
      store the sensed fingerprint pattern as a fingerprint template specific to the identified region of the user's finger impression.

2. The computing device of claim 1, wherein the touch sensor is a touchscreen, the touchscreen to present an image of a desired location of the user's finger impression to the user.

3. The computing device of claim 1, wherein the touch sensor and the display are combined as a touchscreen.

4. The computing device of claim 1, wherein the matching data store is further to:
   store a plurality of fingerprint template segments of the user's finger impression, each segment corresponding to an identified region of the user's finger impression.

5. The computing device of claim 4, the matching feature further to:
   select one or more matching fingerprint template segments and apply the selected fingerprint template segments to a candidate finger impression to identify the user.

6. The computing device of claim 4, wherein the fingerprint sensor defines an area substantially equal to at least one of the subdivision areas of the user's finger impression segments.

7. The computing device of claim 4, wherein the matching data store is further to:
   store a plurality of fingerprint template segments corresponding to each of a plurality of template finger impressions.

8. The computing device of claim 7, wherein the plurality of template finger impressions each correspond to one of a single user and different users.

9. The computing device of claim 1, wherein the fingerprint sensor is one of a capacitive fingerprint sensor and an optical fingerprint sensor.

10. The computing device of claim 1, further comprising:
    another fingerprint sensor defining a different reader area and location within the user interface area, the different reader area also being smaller than the user interface area, wherein the matching feature is further to:
       compare the detected area and location of the user's finger impression on the touch sensor with a reader area and location of the another fingerprint sensor within the touch sensor.

11. A method of using a small-segment fingerprint reader to enroll fingerprint templates corresponding to partial fingerprints within a computing device, the method comprising:
    detecting an area and location of a user's finger impression on a touch sensor;
    instructing the user to modify the area and location of the user's finger impression on the touch sensor, wherein the detecting and instructing operations are repeated iteratively until the detected area and location of the user's finger impression on the touch sensor falls within a predetermined range;
    sensing a fingerprint pattern of the user's finger impression at a fingerprint sensor occupying a reader area within and smaller than the touch sensor;
    comparing the detected area and location of the user's finger impression on the touch sensor with the reader area and location of the fingerprint sensor within the touch sensor;
    identifying one of multiple regions of the user's finger impression oriented over the fingerprint sensor based on the comparing operation;
    reading a sensed fingerprint pattern from the user's finger impression using the fingerprint sensor; and
    storing the sensed fingerprint pattern as a fingerprint template specific to the identified region of the user's finger impression.

12. The method of claim 11, further comprising:
    collecting the stored fingerprint templates corresponding to subdivision areas of the user's finger impression.

13. The method of claim 12, wherein the stored fingerprint templates each correspond to one of a single user and different users.

14. The method of claim 11, wherein the touch sensor is a touchscreen and the instructing operation is performed by displaying the instructions on the touchscreen.

15. The method of claim 11, wherein the instructing operation is performed by displaying the instructions on a display of the computing device.

16. A computing device for enrolling fingerprint templates corresponding to partial fingerprints of a user and identifying a user using the enrolled fingerprint templates comprising:
    a touchscreen defining a user interface area of the computing device, the touchscreen to detect an area and location of a user's finger impression on the touchscreen and present instructions to the user to modify the area and location of the user's finger impression on the touchscreen, wherein the instructions are repeated iteratively until the detected area and location of the user's finger impression on the touchscreen falls within a predetermined range;
    a fingerprint sensor defining a reader area and location within the user interface area, the reader area smaller than the user interface area;

a matching feature stored within electronic storage and executed using a microprocessor, the matching feature to:
  compare the detected area and location of the user's finger impression on the touchscreen with the reader area and location of the fingerprint sensor within the touch sensor,
  identify one of multiple regions of the user's finger impression oriented over the fingerprint sensor based on the comparing operation, and
  read a sensed fingerprint pattern from the user's finger impression using the fingerprint sensor; and
a matching data store to:
  store the sensed fingerprint pattern as a fingerprint template for the identified region of the user's finger impression;
the matching feature further to:
  select one or more matching stored fingerprint templates, and
  apply the selected matching stored fingerprint templates to a sensed candidate finger impression to identify the user.

17. The computing device of claim 16, the touchscreen to present an image of a desired location of the user's finger impression to the user.

18. The computing device of claim 16, wherein a plurality of template finger impressions each correspond to one of a single user and different users.

19. The method of claim 11, further comprising:
  selecting one or more stored fingerprint templates based on one or more corresponding matches in the comparing operation; and
  applying the selected fingerprint templates to the sensed fingerprint pattern to identify the user.

20. The computing device of claim 1, wherein the comparing, identifying, reading, and storing operations are part of a fingerprint enrollment process for the computing device.

21. The method of claim 11, wherein the comparing, identifying, reading, and storing operations are part of a fingerprint enrollment process for the computing device.

22. The computing device of claim 16, wherein the comparing, identifying, reading, and storing operations are part of a fingerprint enrollment process and the selecting and applying operations are part of a fingerprint identification process for the computing device.

* * * * *